(12) United States Patent
Rosen et al.

(10) Patent No.: US 7,969,867 B2
(45) Date of Patent: Jun. 28, 2011

(54) BACKUP ROUTE GENERATION IN BORDER GATEWAY PROTOCOL

(75) Inventors: Eric C. Rosen, Arlington, MA (US); Clarence Filsfils, Brussels (BE); James Neil Guichard, New Boston, NH (US); Keyur P. Patel, San Jose, CA (US); Pradosh Kumar Mohapatra, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 98 days.

(21) Appl. No.: 12/336,469

(22) Filed: Dec. 16, 2008

(65) Prior Publication Data

US 2010/0150020 A1 Jun. 17, 2010

(51) Int. Cl.
*G01R 31/08* (2006.01)
*H04L 12/28* (2006.01)
(52) U.S. Cl. ........................................ 370/216; 370/254
(58) Field of Classification Search .................. None
See application file for complete search history.

(56) References Cited

U.S. PATENT DOCUMENTS

| 2003/0012145 | A1* | 1/2003 | Bragg | 370/254 |
|---|---|---|---|---|
| 2005/0174989 | A1* | 8/2005 | Chen et al. | 370/351 |
| 2006/0274718 | A1* | 12/2006 | Butenweg et al. | 370/351 |
| 2007/0091793 | A1* | 4/2007 | Filsfils et al. | 370/228 |
| 2007/0091794 | A1* | 4/2007 | Filsfils et al. | 370/228 |
| 2007/0091795 | A1* | 4/2007 | Bonaventure et al. | 370/228 |
| 2007/0091796 | A1* | 4/2007 | Filsfils et al. | 370/228 |
| 2008/0025209 | A1* | 1/2008 | Banner et al. | 370/228 |
| 2009/0034413 | A1* | 2/2009 | Sajassi et al. | 370/228 |

OTHER PUBLICATIONS

Rosen et al, RFC 4364 (BGP/MPLS VPNs), Feb. 2006, IETF.org, pp. 1-48.*

* cited by examiner

*Primary Examiner* — Pankaj Kumar
*Assistant Examiner* — Hicham B. Foud
(74) *Attorney, Agent, or Firm* — Schwegman, Lundberg & Woessner, P.A.

(57) ABSTRACT

A method is provided for generating a backup route. Here, a route and a route distinguisher type associated with the route are received and a backup route is generated based on attributes of the route. A particular backup route distinguisher type that is associated with the route distinguisher type is assigned to the backup route. The backup route with the backup route distinguisher type are then advertised. Another method is provided that identifies the backup route. When the route and its route distinguisher type are received from the advertisement, an identification is made as to whether the route distinguisher type is assigned to a backup route. The route may then be designated as a backup route based on the identification.

18 Claims, 10 Drawing Sheets

BACKUP ROUTE GENERATION IN BORDER GATEWAY PROTOCOL

FIELD

The present disclosure relates generally to computer networks. In an embodiment, the disclosure relates to the generation of backup routes in Border Gateway Protocol.

BACKGROUND

Computer networks today require that in the event of a network failure, such as a link or node failure, network traffic forwarding is to be restored within 200 milliseconds. Currently, in the event of a network failure, Border Gateway Protocol (BGP) includes a mechanism to restore network traffic forwarding by exploring the various paths in the computer network in a process called "control plane convergence." However, relying on BGP control plane convergence alone cannot meet such time restrictions because it is typical for such control plane convergence to exceed 200 milliseconds (e.g., typically seconds or even minutes).

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of embodiments of the present disclosure. It will be evident, however, to one skilled in the art that the present disclosure may be practiced without these specific details.

Overview

A method is provided for generating a backup route. Here, a route and a route distinguisher type associated with the route are received and a backup route is generated based on attributes of the route. However, it should be noted that a particular backup route distinguisher type that is associated with the received route distinguisher type is assigned to the backup route. The backup route with this backup route distinguisher type are then advertised.

Another method is provided that identifies the backup route. When the route and the route distinguisher type associated with the route are received from an advertisement, an identification is made as to whether the route distinguisher type is assigned to a backup route. The route may then be designated as a backup route based on the identification.

Example Embodiments

Figure 1:
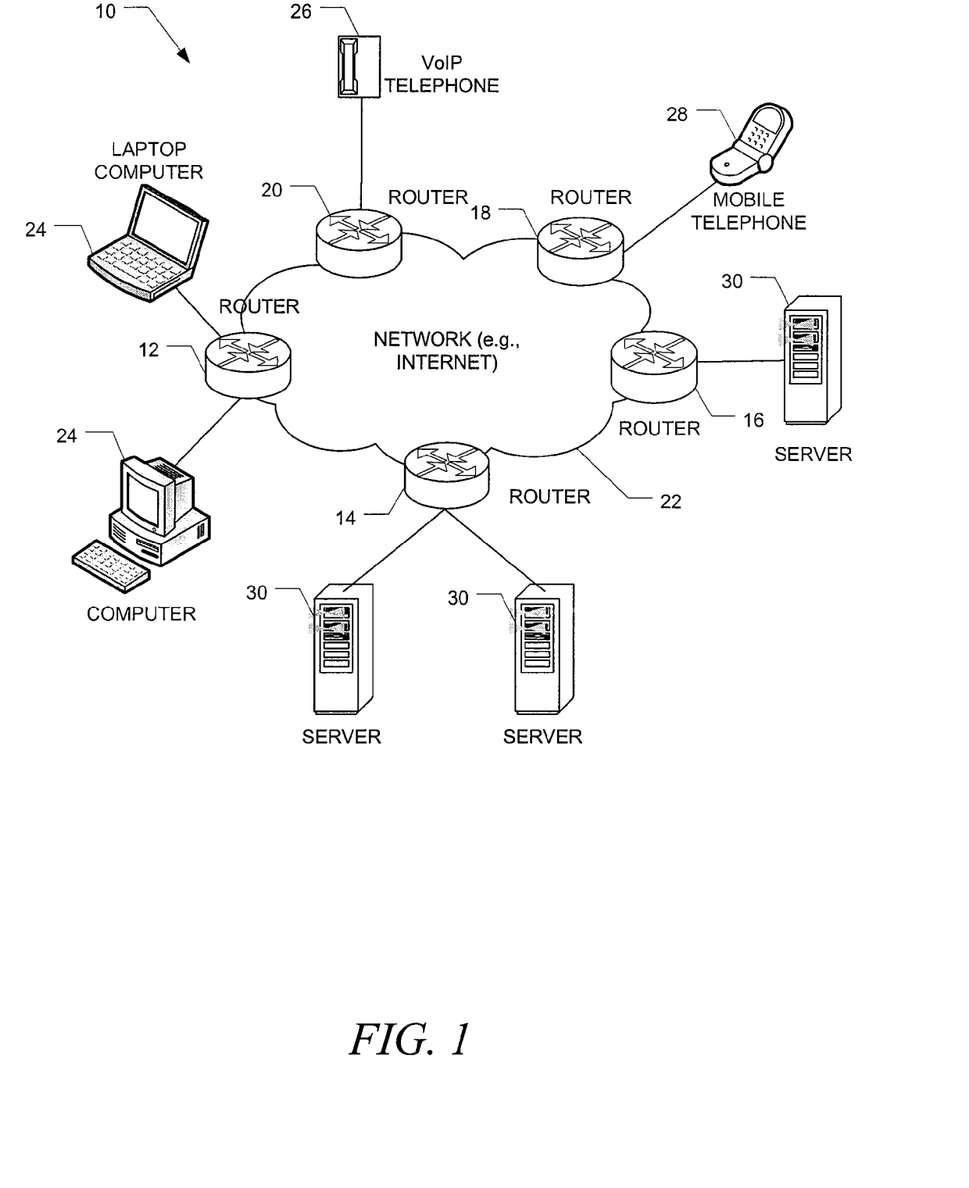
FIG. 1 depicts a diagram of a network system, in accordance with an embodiment.

FIG. 1 depicts a diagram of a network system 10, in accordance with an embodiment. Example network system 10 includes various network nodes, which may be embodied in network devices 12, 14, 16, 18, 20, 24, 26, 28, and 30, and data is communicated between the various network nodes. In particular, the network nodes may include routers 12, 14, 16, 18 and 20 that are shown to be connected by way of a computer network which may include one or more Local Area Networks (LANs) and/or Wide Area Networks (WANs), such as the Internet. The network system 10 also includes other network devices including, for example, computers 24, Voice-over-Internet Protocol (VoIP) telephone 26, mobile telephone 28, and servers 30.

In the example network system 10, data is communicated by way of Internet Protocol (IP) packets or datagrams using a variety of suitable upper-layer transport communication protocols. For example, packets may be encapsulated and communicated using the Transmission Control Protocol (TCP)/Hypertext Transport Protocol (HTTP), the User Datagram Protocol (UDP) protocol, and/or Stream Control Transmission Protocol (SCTP). Further, although the network system 10 is shown to include routers 12-20, it should be noted that the embodiments described herein are equally applicable to other routing devices that receive digital data for processing and communication to other routing devices.

Figure 2:
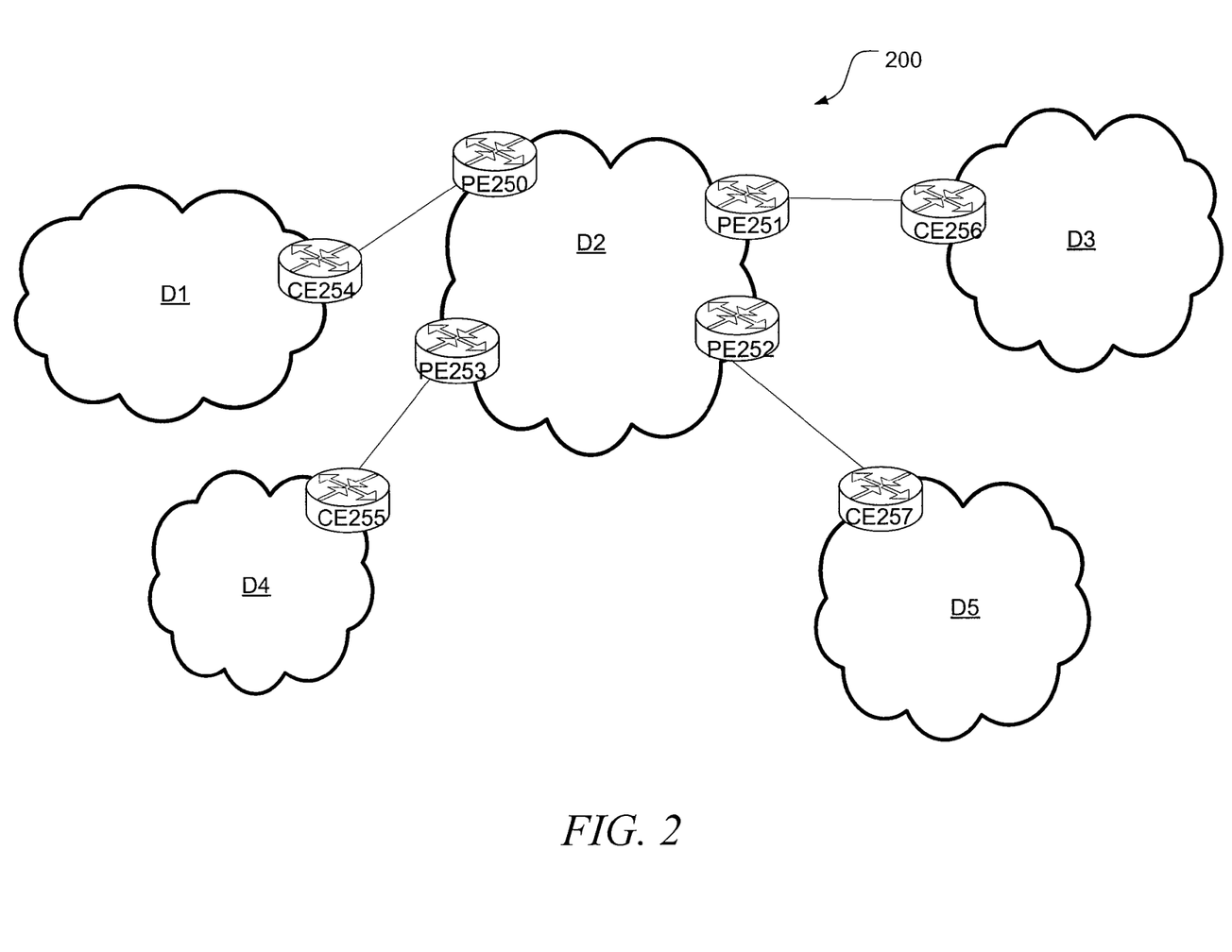
FIG. 2 depicts a diagram of an example computer network, in accordance with an embodiment.

FIG. 2 depicts a diagram of an example computer network 200, in accordance with an embodiment. As shown in FIG. 2, the computer network 200 includes multiple domains D1-D5 interconnected by routers 250-257. It should be appreciated that groups of computer networks may be maintained as routing domains D1-D5. A domain, such as domain D1, D2, D3, D4 or D5, is a collection of network nodes under the control of one or more entities that present a common routing policy. A "domain" D1, D2, D3, D4 or D5 may also be referred to as an autonomous system, a routing domain, or community.

The distinct networks within domains D1-D5 can be coupled together by inter-domain routers 250-257 that are configured to communicate by way of routing protocols and are generally subject to a common authority. A provider edge (PE) router is an example of an inter-domain router that is placed at the edge of an Internet service provider (ISP) network, and may communicate by way of a routing protocol to other provider edge routers or domain. As shown in FIG. 2, the routers 250-253 are examples of provider edge routers. A customer edge (CE) router is another example of an inter-domain router that is located at the edge of a network associated with a customer or subscriber, and the customer edge router may communicate by way of a routing protocol to other routers internal or external to its domain. Routers 254-257 are examples of customer edge routers.

In the example computer network 200 of FIG. 2, the routers 250-257 communicate by way of routing protocols. In general, a routing protocol is a protocol that specifies how routers communicate with each other to disseminate IP address prefixes and thereby allows the routers to select routes for flows of IP packets. An example of a routing protocol is Border Gateway Protocol (BGP), which is an inter-domain routing protocol used within the Internet to exchange IP address prefix and network layer reachability information between domains D1-D5, and to distribute external IP address prefix information within a domain D1, D2, D3, D4, or D5.

Figure 3:
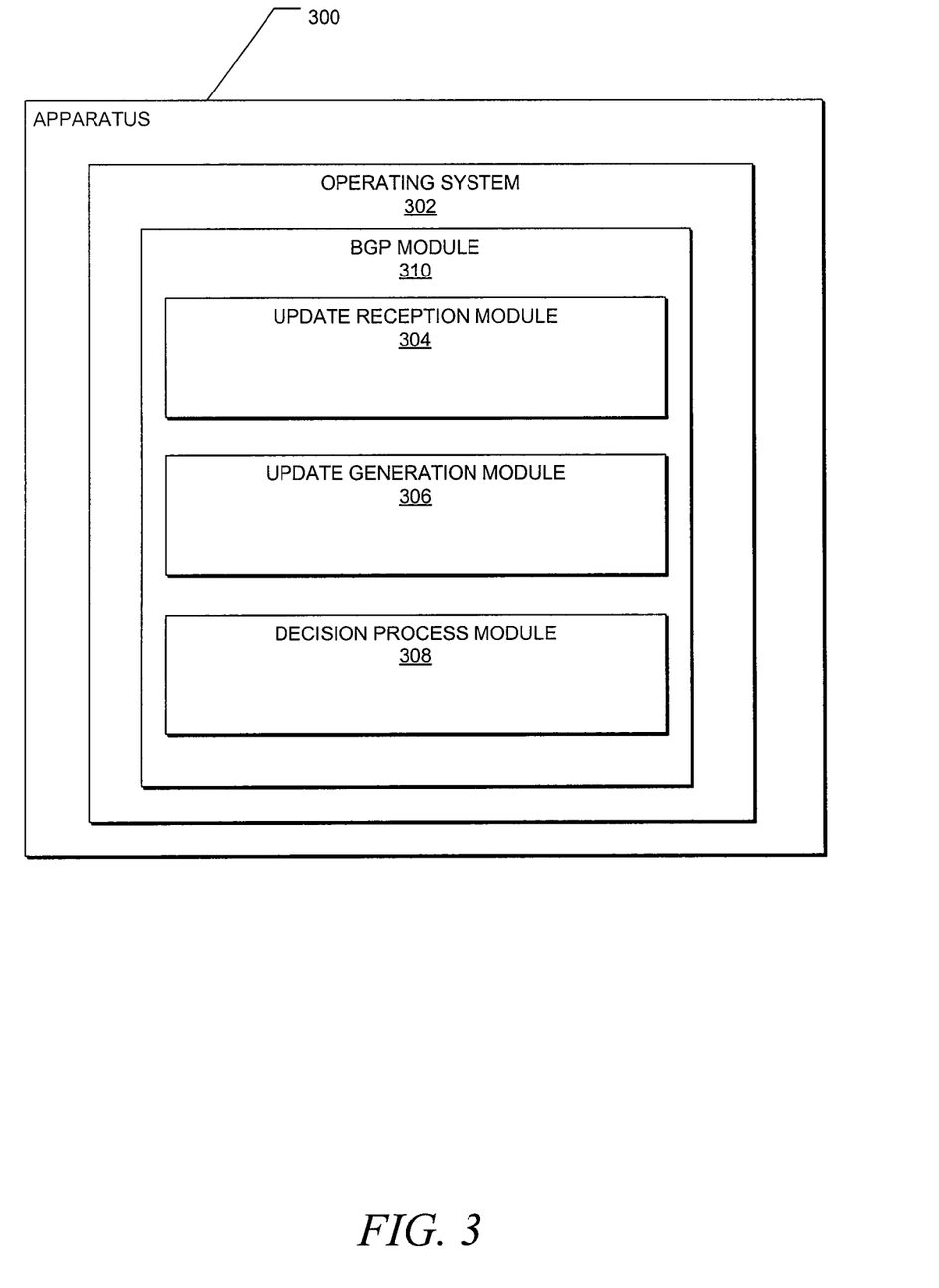
FIG. 3 depicts a block diagram of modules included in an apparatus, in accordance with an embodiment, configured to generate a backup route.

FIG. 3 depicts a block diagram of modules 302, 304, 306, 308, and 310 included in an apparatus 300, in accordance with an embodiment, configured to generate a backup route. It should be appreciated that the apparatus 300 may be deployed in the form of a variety of routing devices, such as a provider edge router 250, 251, 252, or 253 depicted in FIG. 2 or a route reflector. In various embodiments, the apparatus 300 may be used to implement computer programs, logic, applications, methods, processes, or other software to generate a backup route, as described in more detail below. It should be noted that, as used herein, a "backup route" refers to an alternate or secondary route used to route traffic in the event that the primary route fails. The primary route, as described in more detail below, is the principal route used to route network traffic.

The apparatus 300 includes operating system 302 (e.g., an Internetworking Operating System) that manages the software processes and/or services executing on the apparatus 300. As depicted in FIG. 3, these software processes and/or services may include a BGP module 310 that performs various functions provided by BGP. In an illustrative embodiment, the BGP module 310 includes an update reception module 304, an update generation module 306, and a decision process module 308.

The update reception module 304 is configured to receive and forward routes to other modules, such as the update generation module 306 and/or the decision process module 308. A "route," as used herein, refers to a particular unit of route information. It should be appreciated that a single BGP session involves two network nodes and involves an exchange of routing information by way of a point-to-point TCP connection. For example, one network node can notify the other network node, for example, that a particular route is available to a particular network or that a previously advertised route is no longer available. Destination networks are identified by prefixes, for example, a combination of destination network address and bit mask to be used in matching packet addresses to the network address. A path identifies a destination network address (prefix), a list of domains traversed by the BGP message containing the path on its way to the BGP listener, and a next-hop address (e.g., an address of a border router within the domain of the BGP listener that may be used to reach the destination network address). Network nodes receiving BGP route updates use the information to update their own forwarding tables and to propagate the route updates further. Generally, a network node receiving multiple paths to the same destination network picks one or more for its forwarding table and distributes to other network nodes via BGP. In this manner, information about how to route packets across domain boundaries is propagated across the Internet.

The decision process module 308 is configured to identify and select a primary route and one or more backup routes from multiple routes. The identification and selection of the primary route and the backup route can be based on a variety of attributes, such as BGP attributes. An "attribute," as used herein, refers to a parameter of a route. Examples of BGP attributes include weight, local preference, multi-exit discriminator, origin, autonomous system path, next hop, and community.

The update generation module 306 is configured to transmit or advertise routes to other routing devices and also to generate route distinguisher types and assign particular distinguisher types to different types of routes. For example, as will be explained in more detail below, the update generation module 306 may generate and attach a particular route distinguisher type referred to as a backup route distinguisher type to backup routes. The primary routes, as explained in more detail below, are identified by a different set of route distinguisher types.

It should be appreciated that in other embodiments, the apparatus 300 may include fewer or more modules apart from those shown in FIG. 3. For example, the BGP module 304 may be separated into a path computation module that computes routes and another MPLS reroute module that reroutes traffic. The modules 304, 308, and 310 may be in the form of software that is processed by a processor. In another example, the modules 304, 308, and 310 may be in the form of firmware that is processed by Application Specific Integrated Circuits (ASICs), which may be integrated into a circuit board. Alternatively, modules 304, 308, and 310 may be in the form of one or more logic blocks included in a programmable logic device (e.g., a field-programmable gate array). The described modules may be adapted, and/or additional structures may be provided, to provide alternative or additional functionalities beyond those specifically discussed in reference to FIG. 3. Examples of such alternative or additional functionalities will be discussed in reference to the flow diagrams discussed below. The modifications or additions to the structures described in relation to FIG. 3 to implement these alternative or additional functionalities will be implementable by those skilled in the art, having the benefit of the present specification and teachings.

Figure 4:
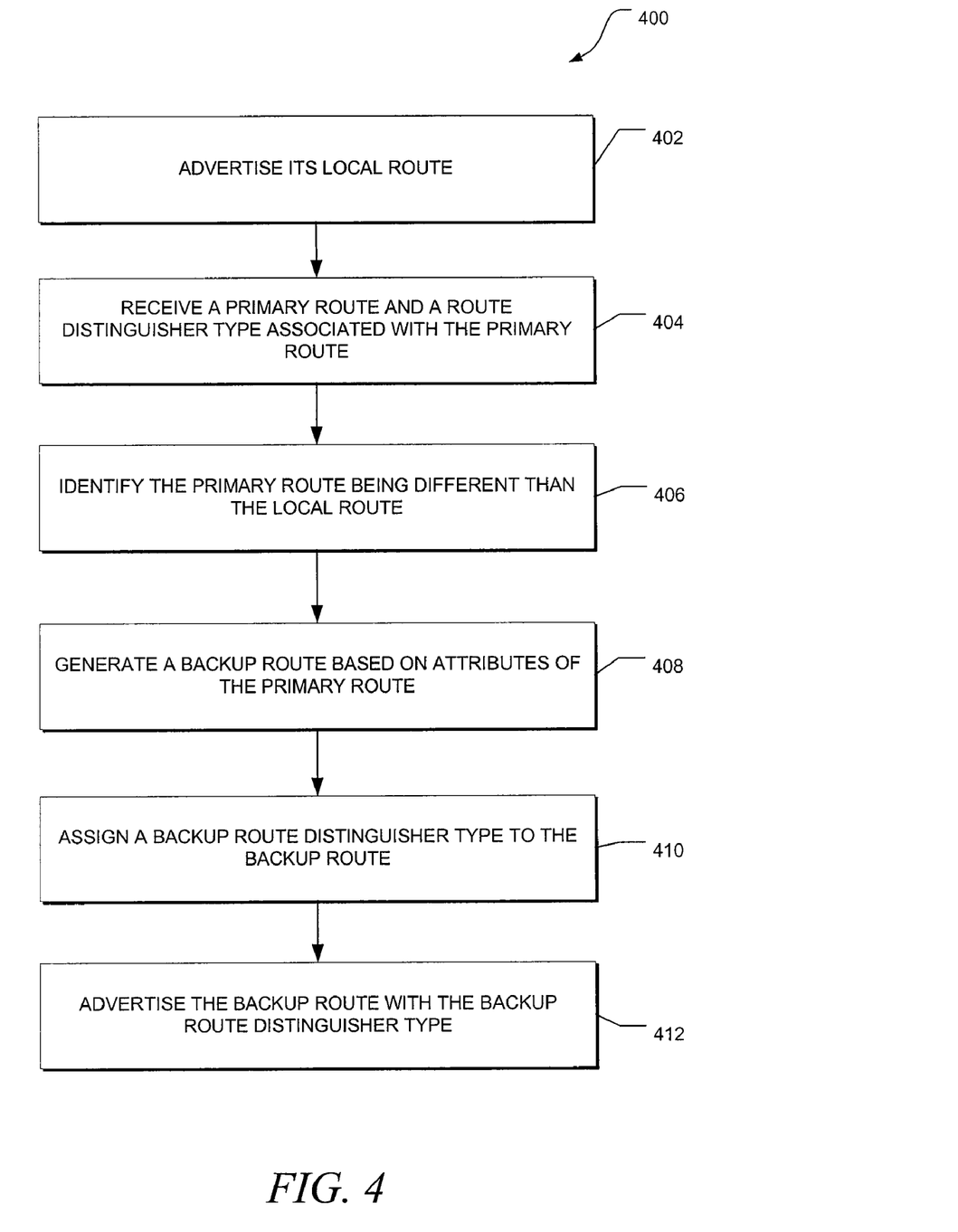
FIG. 4 depicts a flow diagram of a general overview of a method, in accordance with an embodiment, for generating a backup route.

FIG. 4 depicts a flow diagram of a general overview of a method 400, in accordance with an embodiment, for generating a backup route. In an embodiment, the method 400 may be implemented by the BGP module 304 and employed in the apparatus 300 of FIG. 3. As depicted in FIG. 4, a routing device, for example, initially advertises its previously established local route at 402. A "local route," as used herein, is a route to other network devices generated by or originated from a routing device based on local external route availability.

In response to the advertisement, the routing device receives a primary route and a route distinguisher type associated with the primary route at 404. As discussed above, a "primary route" is the principal route used to route network traffic. In an example, the primary route may be a best route calculated or selected from multiple routes received from other routing devices. Here, the primary route (or best route) may be selected using, for example, a BGP decision process, which selects the primary route based on a variety of different criteria, such as interior gateway protocol (IGP) distance.

In an embodiment, it should be appreciated that a route distinguisher may be encoded in a Virtual Private Network-Internet Protocol (VPN-IP) address, such as VPN-IP version 4 (VPN-IPv4), which is a 12-byte quantity, beginning with an 8-byte route distinguisher and ending with a 4-byte IPv4 address. If several virtual private networks use the same IPv4 address prefix, the IPv4 may be translated into unique VPN-IPv4 address prefixes. The use of VPN-IPv4 ensures that if the same address is used in several different virtual private networks, it is possible for BGP to carry several completely different routes to that address, one for each virtual private network. Another example of a VPN-IP address is VPN-IP version 6 (VPN-IPv6), which is a 24-byte quantity, beginning with an 8-byte and ending with a 16-byte IPv6 address. In an alternative embodiment, the route distinguisher may also be encoded in an Internet Protocol address (e.g., IPv4 and IPv6) where a route reflector, for example, can add route distinguisher types to differentiate between different paths.

The route distinguisher is a number, and it does not contain any inherent information. The route distinguisher allows the creation of distinct routes to a common IP address prefix. That is, the route distinguisher is configured to uniquely identify an IP address. The route distinguisher can also be used to create multiple different routes to the very same system. As an example, a provider edge router can be configured such that routes that lead to a particular customer edge router become associated with a particular route distinguisher.

The route distinguisher is structured such that every service provider can administer its own numbering space (e.g., can make its own assignments of route distinguishers), without conflicting with the route distinguisher assignments made by other service providers. The route distinguisher includes three fields: a type field, an administrator field, and an assigned number field. The value of the type field determines the lengths of the other two fields, as well as the semantics of the administrator field. The administrator field identifies an assigned number authority, and the assigned number field contains a number that has been assigned, by the identified authority, for a particular purpose. Currently, the route distinguisher has three different type fields, defined as type 0, type 1, and type 2, which are explained in the following Table A:

TABLE A

Type 0: The value field includes two subfields:

Administrator subfield: 2 bytes
Assigned number subfield: 4 bytes
The administrator subfield contains an autonomous system number (ASN).
If this ASN is from the public ASN space, the ASN is assigned by an appropriate authority. The assigned number subfield contains a number from a numbering space that is administered by the enterprise to which the ASN has been assigned by an appropriate authority.
Type 1: The value field includes two subfields:

Administrator subfield: 4 bytes
Assigned number subfield: 2 bytes
The administrator subfield contains an IP address. If this IP address is from the public IP address space, the IP address is assigned by an appropriate authority. The assigned number subfield contains a number from a numbering space that is administered by the enterprise to which the IP address has been assigned.
Type 2: The value field includes two subfields:

Administrator subfield: 4 bytes
Assigned number subfield: 2 bytes
The administrator subfield contains an ASN. If this ASN is from the public ASN space, the ASN is assigned by the appropriate authority. The assigned number subfield contains a number from a numbering space which is administered by the enterprise to which the ASN has been assigned by an appropriate authority.

Still referring to FIG. 4, upon receipt of the primary route, the routing device identifies that the primary route is different from the local route at 406. That is, the primary route does not correspond to the local route. As a result, at 408, the routing device generates a backup route based on attributes of the primary route. For example, the routing device can generate a backup route using its local attributes of the primary route.

At 410, the routing device assigns to the backup route a backup route distinguisher type and advertises the backup route with this backup route distinguisher type to other routing devices at 412. This backup route distinguisher type is different from the route distinguisher types discussed above because it is a new type value designated to uniquely identify a route as a backup route. As an example, the backup route distinguisher type can be an extension of the existing 0, 1, and 2 types. In an embodiment, the backup route distinguisher has three different type fields, defined as type 3, type 4, and type 5. Each backup route distinguisher type is formatted to mirror a route distinguisher type assigned to a primary route, such as type values 0, 1, and 2. For example, backup route distinguisher type 3 can have the same format as route distinguisher type 0. Backup route distinguisher type 4 can have the same format as route distinguisher type 1, and backup route distinguisher type 5 can have the same format as route distinguisher type 2. The effect is that the backup route distinguisher type identifies the route to be a backup route of a primary route with an associated route distinguisher type. The formats of the backup route distinguisher types 3, 4, and 5 for VPN-IPv4 are explained in detail in the following Table B:

TABLE B

Type 3: The value field includes two subfields:

Administrator subfield: 2 bytes
Assigned number subfield: 4 bytes
The administrator subfield contains an ASN. If this ASN is from the public ASN space, the ASN is assigned by an appropriate authority. The assigned number subfield contains a number from a numbering space that is administered by the enterprise to which the ASN has been assigned by an appropriate authority. The type 3 route distinguisher can be interpreted as a backup of a VPN-IPv4 address with the same format as type 0 route distinguisher.
Type 4: The value field includes two subfields:

Administrator subfield: 4 bytes
Assigned number subfield: 2 bytes
The administrator subfield contains an IP address. If this IP address is from the public IP address space, the IP address is assigned by an appropriate authority. The assigned number subfield contains a number from a numbering space that is administered by the enterprise to which the IP address has been assigned. The type 4 route distinguisher can be interpreted as a backup of a VPN-IPv4 address with the same format as type 1 route distinguisher.
Type 5: The value field includes two subfields:

Administrator subfield: 4 bytes
Assigned Number subfield: 2 bytes
The administrator subfield contains an ASN. If this ASN is from the public ASN space, the ASN is assigned by the appropriate authority. The assigned number subfield contains a number from a numbering space which is administered by the enterprise to which the ASN has been assigned by an appropriate authority. The type 5 route distinguisher can be interpreted as a backup of a VPN-IPv4 address with the same format as type 2 route distinguisher.

As an example, if a primary route has a route distinguisher type 0, then a backup route distinguisher type 3, which is associated with type 0, can be assigned to the backup route. In another example, if a primary route has a route distinguisher type 2, then the backup route distinguisher type 5, which is associated with type 2, can be assigned to the backup route. It should be appreciated that in addition to backup route distinguisher types 3, 4, and 5, other suitable route distinguisher types may be designated or created to identify backup routes. For example, types 7, 8, 9 or other type values may also be designated to identify backup routes.

Figure 5A:
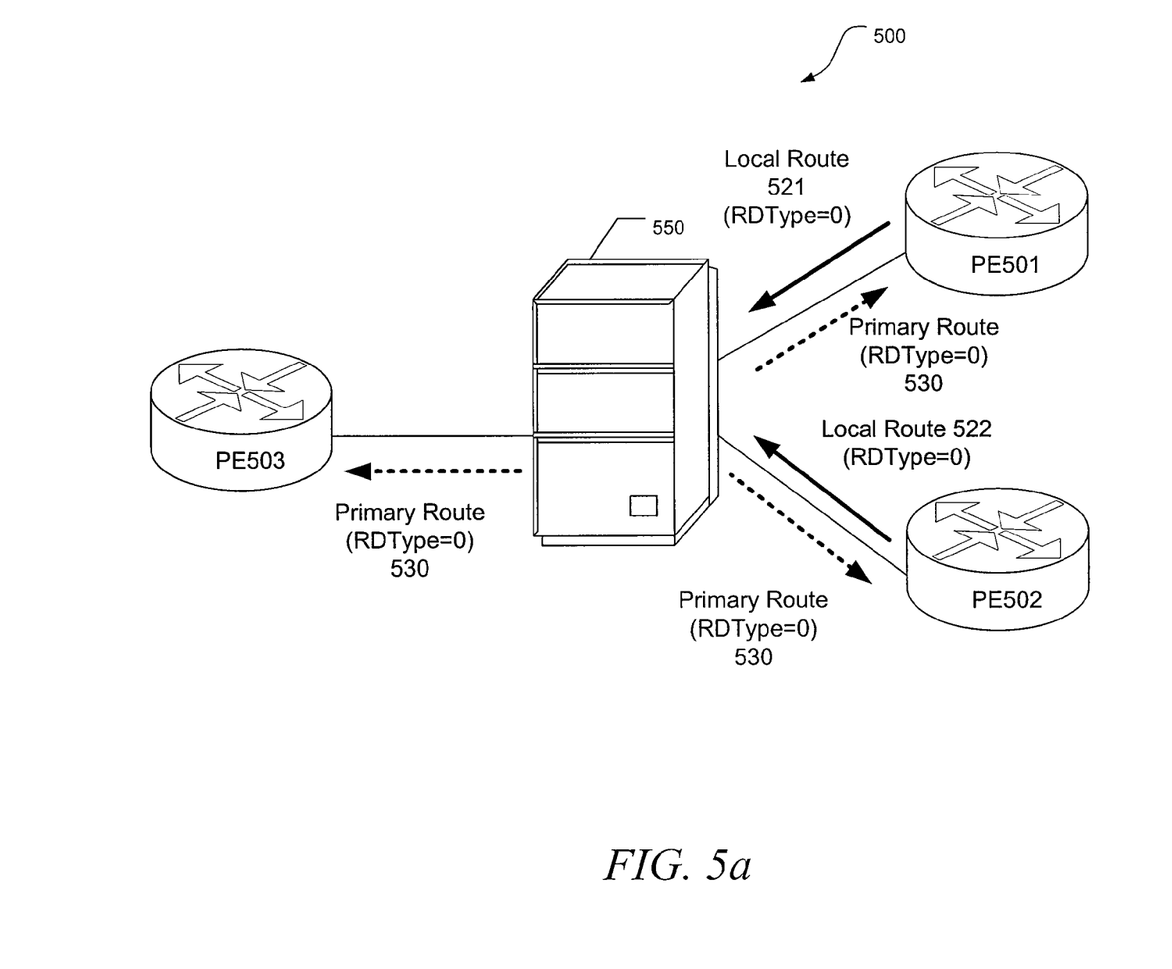
FIGS. 5a and 5b are diagrams depicting an example network system, in accordance with an embodiment, for the generation and advertisement of a backup route.
Figure 5B:
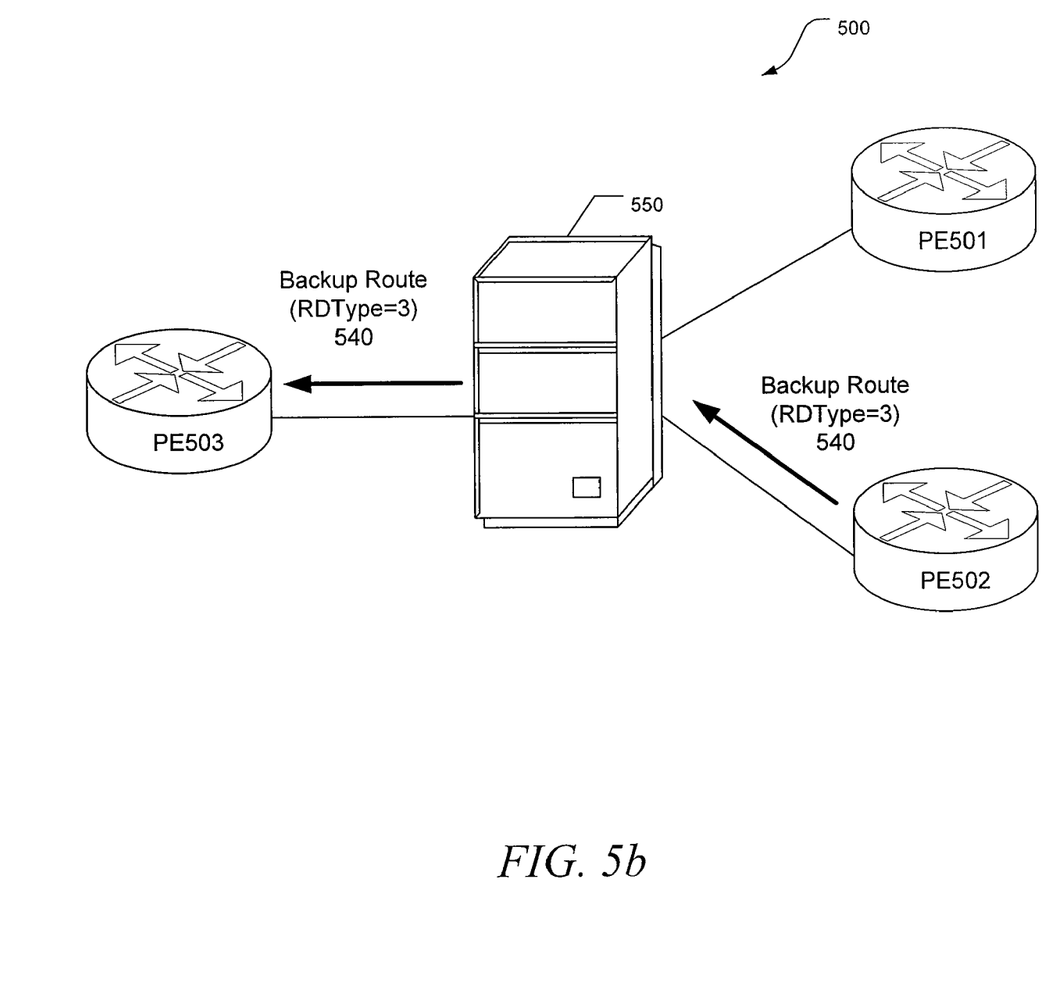

FIGS. 5a and 5b are diagrams depicting an example network system 500, in accordance with an embodiment, for the generation and advertisement of a backup route. As depicted in FIG. 5a, the network system 500 includes a route reflector 550 in communication with provider edge routers 501-503. The route reflector 550 serves as a focal point for BGP sessions and is configured to pass or reflect routes to internal neighboring nodes. In this example, the provider edge routers 501 and 502 advertise their local routes 521 and 522, respectively, to the route reflector 550. Here, the route distinguisher type associated with the local routes 521 and 522 is type 0 because, for example, the provider edge routers 501-503 belong to one domain (or autonomous system).

The route reflector 550 receives the local routes 521 and 522 and selects one of the local routes 521 or 522 as a primary route using a BGP decision process. In the example of FIG. 5a, the route reflector 550 selects the local route 521 to provider edge router 501 as a primary route 530 by, for example, designating the local route 521 as a primary route in its forwarding table. The route reflector 550 then advertises this primary route 530 (with same route distinguisher type 0) to all provider edge routers 501-503.

Referring to FIG. 5b, the provider edge routers 501 and 502 receive the primary route 530 with route distinguisher type 0 and may generate a backup route depending on whether the primary route 530 corresponds to their local routes 521 and 522. In particular, the provider edge router 501 identifies whether the primary route 530 is different from its local route 521. Since the local route 521 to the provider edge router 501 is selected as the primary route 530, the provider edge router 501 ignores the received primary route 530 and continues to use its local route 521 to forward network traffic.

On the other hand, the provider edge router 502 identifies that the received primary route 530 is different from its local route 522. In an embodiment, the primary route 530 is preferred over the local route 522, the preference of which is explained in more detail below, and the provider edge router 502 thereafter withdraws its local route 522. In another embodiment, as explained in more detail below, the provider edge router 502 may not withdraw its local route 522.

Regardless of whether the local route 522 is withdrawn, the provider edge router 502 then generates a backup route 540 using its local attributes of the received primary route 530 but assigns a backup route distinguisher type 3, which corresponds to the route distinguisher type 0 associated with the primary route 530, to the backup route 540. The backup route 540 with its backup route distinguisher type 3 are then advertised to the provider edge router 503 by way of the route reflector 550. The backup route distinguisher type 3 identifies the associated route as a backup route 540 of the primary route 530 with route distinguisher type 0. For example, as explained in more detail below, the provider edge router 503 receives the route 540 and identifies the route 540 as being a backup route to the primary route 530 because the route distinguisher type associated with the route 540 is type 3, which corresponds to the route distinguisher type 0 associated with the primary route 530.

Figure 6:
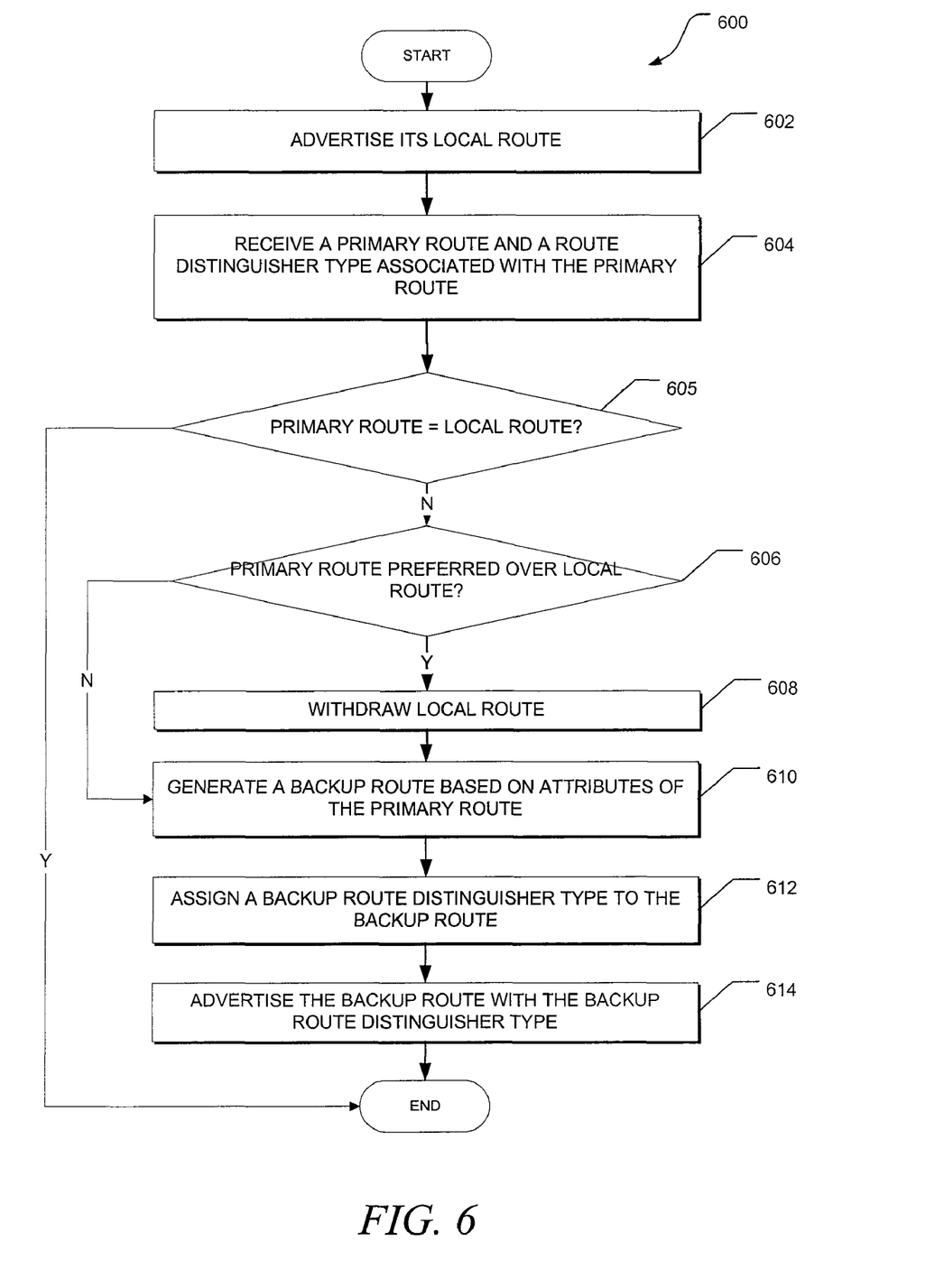
FIG. 6 depicts a flow diagram of a detailed method, in accordance with an embodiment, for generating a backup route.

FIG. 6 depicts a flow diagram of a detailed method 600, in accordance with an embodiment, for generating a backup route. At 602, a routing device, for example, advertises its local route to other routing devices. In response to the advertisement, the routing device receives a primary route and a route distinguisher type associated with the primary route at 604.

The routing device then identifies whether the received primary route corresponds to its local route at 605. If the primary route corresponds to its local route, the routing device ignores the primary route and continues to use its local route to forward network traffic. However, if the primary route is different from the local route, then the routing device identifies whether the primary route is preferred over its local route at 606. It should be noted that particular BGP attributes may be modified or manipulated in order to, for example, override certain aspects of BGP. In particular, a local preference may be changed to force a routing device to select a particular route over other routes. If there is no local preference, then the routing device withdraws its local route at 608. However, if the local preference is set such that the local route is preferred over the primary route, then the routing device does not withdraw its local route.

Whether or not the routing device withdraws its local route, a backup route is generated based on the attributes of the primary route at 610, which is discussed above. At 612, the routing device assigns to the backup route a backup route distinguisher type based on the route distinguisher type associated with the primary route. The backup route with its backup route distinguisher type is then advertised to other routing devices at 614.

Figure 7:
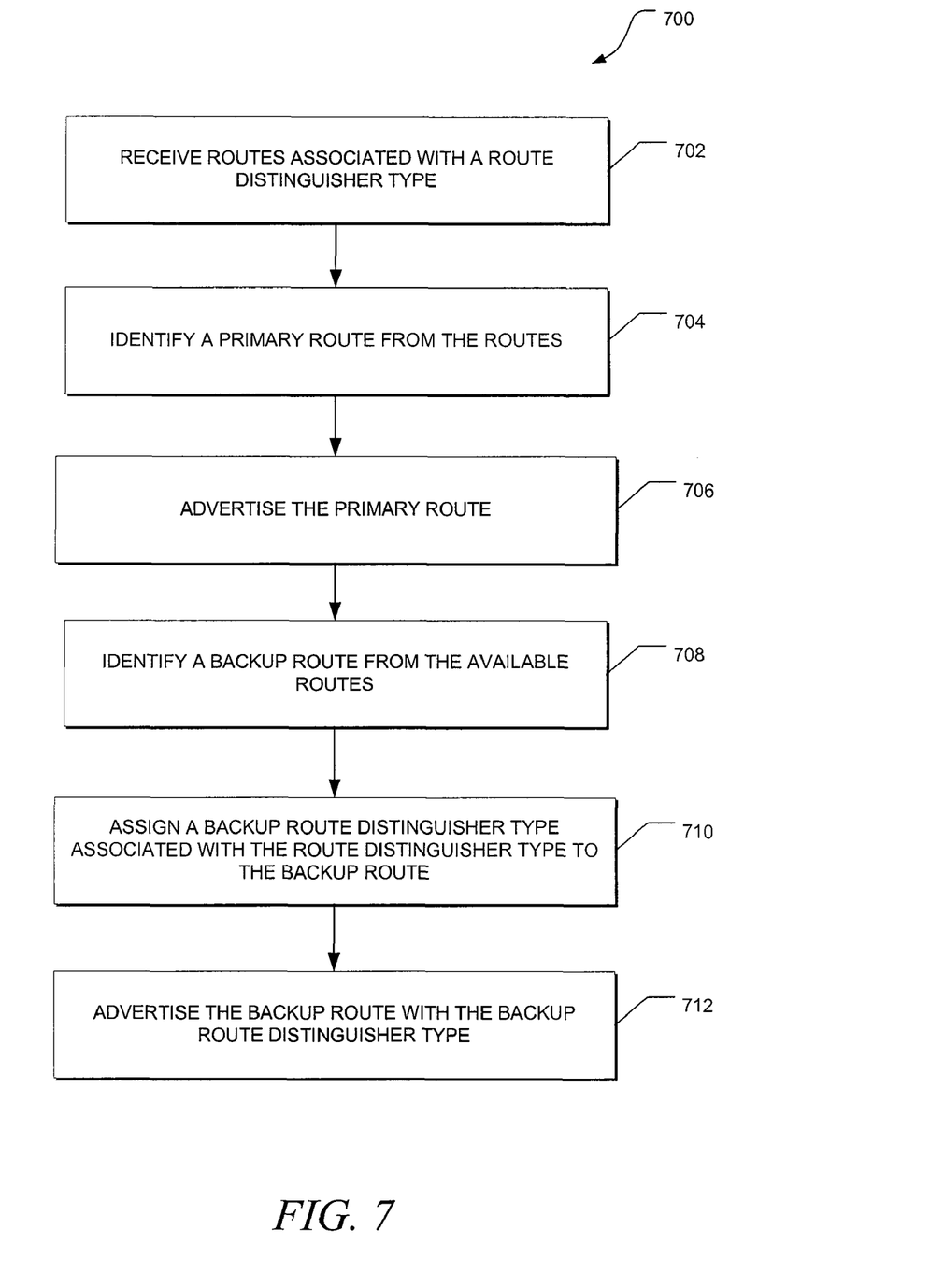
FIG. 7 depicts a flow diagram of a general overview of a method, in accordance with an embodiment, for identifying and selecting a backup route.

It should be noted that in another embodiment, a route reflector may also be configured to identify backup routes. FIG. 7 depicts a flow diagram of a general overview of a method 700, in accordance with an embodiment, for identifying and selecting a backup route. In an embodiment, the method 700 may be implemented by the BGP module 310 of FIG. 3 and employed in the route reflector 550 of FIG. 5a. As depicted in FIG. 7, the route reflector receives multiple routes associated with a particular route distinguisher type at 702, such as type 0, type 1, or type 2. Thereafter, the route reflector identifies and selects a primary route from all the available routes at 704 based on attributes of the routes and advertises this primary route at 706 to other routing devices.

After the primary route is selected, the route reflector identifies and selects one or more backup routes at 708 from all the available routes remaining after the selection of the primary route based on attributes of the routes. The route reflector then generates and assigns to the identified backup route at 710 a backup route distinguisher type (e.g., type 3, type 4, or type 5), which is associated with a particular route distinguisher type. This backup route with its backup route distinguisher type is then advertised at 712 to other routing devices.

Figure 8:
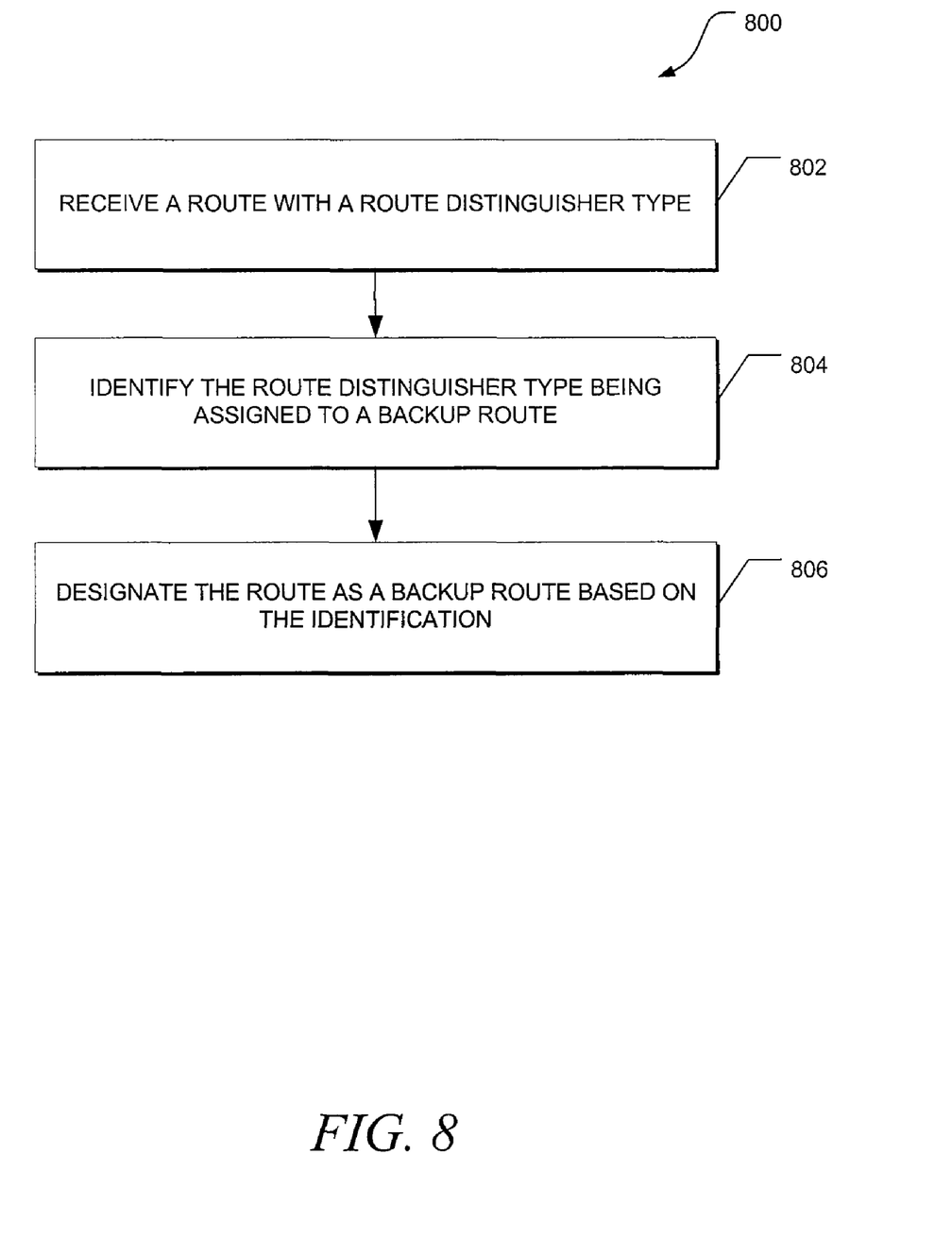
FIG. 8 depicts a flow diagram of a general overview of a method, in accordance with an embodiment, for identifying and designating backup routes.

FIG. 8 depicts a flow diagram of a general overview of a method 800, in accordance with an embodiment, for identifying and designating backup routes. In an embodiment, the method 800 may be implemented by the BGP module 304 depicted in FIG. 3 and employed in the provider edge router 503 depicted in FIG. 5b. As depicted in FIG. 8, a routing device receives a route and a route distinguisher type associated with the route at 802. The routing device then identifies at 804 whether this route distinguisher type is assigned to a backup route.

The identification is made in order to determine whether the received route is a backup route. In an embodiment, the route distinguisher types that have been assigned to or designated for backup routes (or backup route distinguisher types) may be stored in a list (e.g., a lookup table or other data structures). The identification may be made by identifying a match of the received route distinguisher type with the type values stored in the list. For example, the list may include type values 3, 4, and 5, which are the types assigned to backup routes. The received route distinguisher type is compared with the route distinguisher types identified in the list, and if the received route distinguisher type does not match any type value, then the route distinguisher type is assigned to a primary route. On the other hand, if the received route distinguisher type matches any one of these type values, then the received route distinguisher type is assigned to a backup route.

Alternatively, the list may include type values 0, 1, and 2, which are the types assigned to primary routes. The received route distinguisher type is compared with the route distinguisher types identified in the list, and if the received route distinguisher type does not match any type value (a mismatch), then the route distinguisher type is assigned to a backup route. On the other hand, if the received route distinguisher type matches any one of these type values, then the received route distinguisher type is assigned to a primary route.

If the received route distinguisher type is identified as being assigned to a primary route, then the received route is designated a primary route. However, if the received route distinguisher type is identified as being assigned to a backup route, then the received route is designated as a backup route at 806 by, for example, designating the received route as a backup route in the forwarding table.

Returning to FIGS. 5a and 5b, the application of the above-referenced embodiments results in the provider edge router 501 being able to use its local route 521 but also having a backup route 540 reachable by way of provider edge router 502. Provider edge router 502, on the other hand, is able to use the primary route 530 by way of provider edge router 501, but generates and advertises its backup route 540 into a BGP mesh. The provider edge router 503 has primary route 530 and backup route 540 available for use, but selects the primary route 530 as the best path based on, in part, the route distinguisher type 0 associated with the primary route 530 preceding the route distinguisher type 3 associated with the backup route 540.

Figure 9:
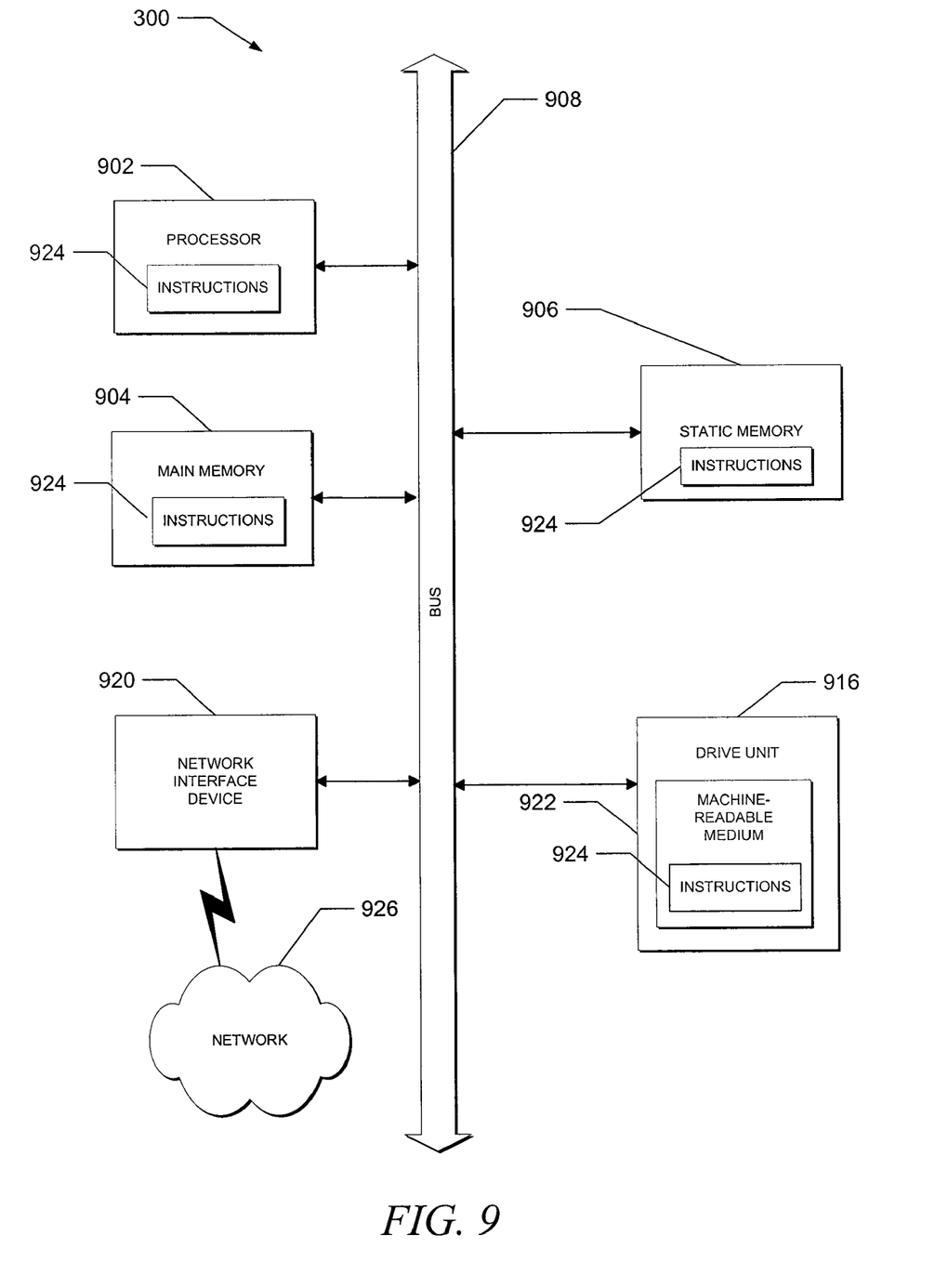
FIG. 9 is a simplified block diagram of a machine in the example form of an apparatus within which a set of instructions, for causing the machine to perform any one or more of the methodologies discussed herein, may be executed.

FIG. 9 is a simplified block diagram of a machine in the example form of an apparatus 300 within which a set of instructions, for causing the machine to perform any one or more of the methodologies discussed herein, may be executed. In alternative embodiments, the machine may be connected (e.g., networked) to other machines. The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example apparatus 300 includes processor 902 (e.g., a central processing unit (CPU)), main memory 904, and static memory 906, which communicate with each other via bus 908. The apparatus 300 may also include a disk drive unit 916 and a network interface device 920.

The disk drive unit 916 includes machine-readable medium 922 on which is stored one or more sets of instructions and data structures (e.g., software 924) embodying or utilized by any one or more of the methodologies or functions described herein. The software 924 may also reside, completely or at least partially, within main memory 904 and/or within processor 902 during execution thereof by apparatus 300, with the main memory 904 and the processor 902 also constituting machine-readable, tangible media. The software 924 may further be transmitted or received over network 926 via network interface device 920 utilizing any one of a number of well-known transfer protocols.

While machine-readable medium 922 is shown in an embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific embodiments, it will be evident that various modifications and changes may be made to these embodiments without departing from the broader spirit and scope of the invention. Accordingly, the specification and drawings are to be regarded in an illustrative rather than a restrictive sense.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. Logic encoded in one or more non-transitory tangible media for execution and when executed operable to:
   receive a route and a route distinguisher type associated with the route;
   identify the route distinguisher type being assigned to a backup route; and
   designate the route as the backup route based on the identification,
   wherein a list of a plurality of backup route distinguisher types assigned to a backup route is provided, and wherein the operation of identifying the route distinguisher type, when executed being further operable to:
      compare the route distinguisher type to the plurality of backup route distinguisher types identified in the list; and
      identify a match of the route distinguisher type with a backup route distinguisher type identified in the list based on the comparison.

2. The logic of claim 1, wherein the route is established based on a Border Gateway Protocol.

3. The logic of claim 1, wherein the route distinguisher type is type 3, type 4, or type 5.

4. The logic of claim 1, wherein the plurality of backup route distinguisher types identified in the list includes type 3, type 4, and type 5.

5. The logic of claim 1, wherein a list of a plurality of route distinguisher types assigned to a primary route is provided, and wherein the operation of identifying the route distinguisher type, when executed being further operable to:
   compare the route distinguisher type to the plurality of route distinguisher types identified in the list; and
   identify a mismatch of the route distinguisher type with the plurality of route distinguisher types identified in the list based on the comparison.

6. The logic of claim 5, wherein the plurality of route distinguisher types identified in the list includes type 0, type 1, and type 2.

7. A method comprising:
   receiving a route and a route distinguisher type associated with the route;
   identifying the route distinguisher type being assigned to a backup route; and designating the route as the backup route based on the identification,
    wherein a list of a plurality of backup route distinguisher types assigned to a backup route is provided, and wherein the identifying of the route distinguisher type further comprises:
        comparing the route distinguisher type to the plurality of backup route distinguisher types identified in the list; and
        identifying a match of the route distinguisher type with a backup route distinguisher type identified in the list based on the comparison.

8. The method of claim 7, wherein the route is established based on a Border Gateway Protocol.

9. The method of claim 7, wherein the route distinguisher type is type 3, type 4, or type 5.

10. The method of claim 7, wherein the plurality of backup route distinguisher types identified in the list includes type 3, type 4, and type 5.

11. The method of claim 7, wherein a list of a plurality of route distinguisher types assigned to a primary route is provided, and wherein the identifying of the route distinguisher type further comprises:
    comparing the route distinguisher type to the plurality of route distinguisher types identified in the list; and
    identifying a mismatch of the route distinguisher type with the plurality of route distinguisher types identified in the list based on the comparison.

12. The method of claim 7, wherein the plurality of route distinguisher types identified in the list includes type 0, type 1, and type 2.

13. An apparatus comprising:
at least one processor; and
a machine-readable medium in communication with the at least one processor, the machine-readable medium being configured to store a Border Gateway Protocol (BGP) module, the BGP module being executed by the at least one processor cause the operations to be performed, comprising:
    receive a route and a route distinguisher type associated with the route;
    identify the route distinguisher type being assigned to a backup route; and
    designate the route as the backup route based on the identification,
        wherein a list of a plurality of backup route distinguisher types assigned to a backup route is provided, and wherein the operation of identifying the route distinguisher type, when executed being further operable to:
            compare the route distinguisher type to the plurality of backup route distinguisher types identified in the list; and
            identify a match of the route distinguisher type with a backup route distinguisher type identified in the list based on the comparison.

14. The apparatus of claim 13, wherein the route is established based on a Border Gateway Protocol.

15. The apparatus of claim 13, wherein the route distinguisher type is type 3, type 4, or type 5.

16. The apparatus of claim 13, wherein the plurality of backup route distinguisher types identified in the list includes type 3, type 4, and type 5.

17. The apparatus of claim 13, wherein a list of a plurality of route distinguisher types assigned to a primary route is provided, and wherein the operation of identifying the route distinguisher type, when executed being further operable to:
    compare the route distinguisher type to the plurality of route distinguisher types identified in the list; and
    identify a mismatch of the route distinguisher type with the plurality of route distinguisher types identified in the list based on the comparison.

18. The apparatus of claim 13, wherein the plurality of route distinguisher types identified in the list includes type 0, type 1, and type 2.

\* \* \* \* \*